United States Patent
Nannini et al.

(10) Patent No.: US 9,095,842 B2
(45) Date of Patent: Aug. 4, 2015

(54) DIATOMACEOUS EARTH FILTER AID CONTAINING A LOW CRYSTALLINE SILICA CONTENT

(71) Applicant: EP Minerals, LLC, Reno, NV (US)

(72) Inventors: Michael Joseph Nannini, Sparks, NV (US); Wilson Kamau Wanene, Reno, NV (US); Chongjun Jiang, Reno, NV (US); Peter Edward Lenz, Reno, NV (US)

(73) Assignee: EP MINERALS, LLC, Reno, NV (US)

( * ) Notice: Subject to any disclaimer, the term of this patent is extended or adjusted under 35 U.S.C. 154(b) by 225 days.

(21) Appl. No.: 13/713,324

(22) Filed: Dec. 13, 2012

(65) Prior Publication Data

US 2014/0171305 A1   Jun. 19, 2014

(51) Int. Cl.
  *B01J 20/30*  (2006.01)
  *B01J 20/14*  (2006.01)
  *B01J 20/28*  (2006.01)
  *C12H 1/044*  (2006.01)

(52) U.S. Cl.
  CPC .............. *B01J 20/3078* (2013.01); *B01J 20/14* (2013.01); *B01J 20/2803* (2013.01); *B01J 20/3042* (2013.01); *C12H 1/0408* (2013.01)

(58) Field of Classification Search
  CPC ........ B01J 20/14; B01J 20/3078; B01J 20/04; B01J 20/10; B01J 20/103; B01J 20/045; B01J 20/041
  USPC .......................................... 502/400, 411, 412
  See application file for complete search history.

(56) References Cited

U.S. PATENT DOCUMENTS

| | | |
|---|---|---|
| 1,985,526 A | 12/1934 | McKinley et al. |
| 4,325,844 A | 4/1982 | Olmsted, Jr. |
| 4,743,634 A | 5/1988 | Royer, Jr. |
| 5,179,062 A | 1/1993 | Dufour |
| 5,302,200 A | 4/1994 | Smetana et al. |
| 5,656,568 A | 8/1997 | Shiuh et al. |
| 5,710,090 A | 1/1998 | Dufour |
| 8,084,392 B2 | 12/2011 | Lenz et al. |
| 2009/0181848 A1 | 7/2009 | Lenz et al. |
| 2010/0248953 A1 | 9/2010 | Nyamekye et al. |
| 2011/0195168 A1 | 8/2011 | Wang |

FOREIGN PATENT DOCUMENTS

| | | |
|---|---|---|
| EP | 0302965 A2 | 2/1989 |
| EP | 0758560 A1 | 2/1997 |
| EP | 0790070 A1 | 8/1997 |
| WO | 2013014450 A1 | 1/2013 |

OTHER PUBLICATIONS

Farrah, Sr et al. "Use of modified diatomaceous earth for removal and recovery of viruses in water". Applied and Environmental Microbiology. Sep. 1991. vol. 5, No. 79, pp. 2502-2508; p. 2, abstract.
International Search report for corresponding International Application No. PCT/US13/67190 filed on Oct. 29, 2013; Report dated Feb. 24, 2014.

*Primary Examiner* — Anthony J Zimmer
(74) *Attorney, Agent, or Firm* — Miller, Matthias & Hull LLP

(57) ABSTRACT

A diatomaceous earth product with low crystalline silica content after at least one calcination step of between about 927° C. (1700° F.) and about 1149° C. (2100° F.) is disclosed. The product comprises natural diatomaceous earth and at least one binding agent comprising potassium silicate. Further the product comprises no more than about 4.0 wt % of crystalline silica and has a permeability in the range of about 0.3 darcy to greater than about 20 darcy. A process for making such diatomaceous earth product with a low crystalline silica content is disclosed. Moreover, a diatomaceous earth filter aid comprising such a diatomaceous earth product is disclosed.

15 Claims, 1 Drawing Sheet

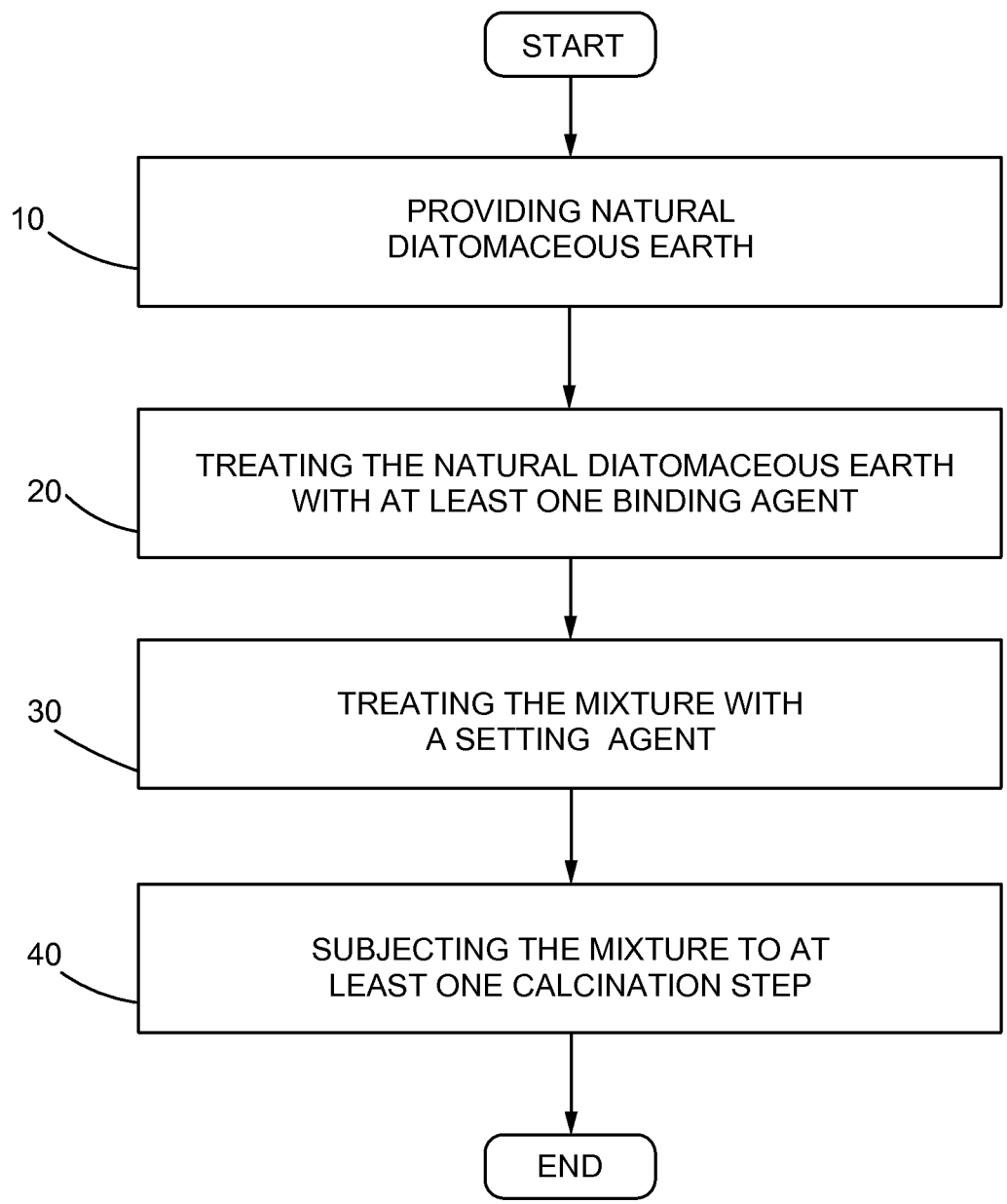

DIATOMACEOUS EARTH FILTER AID CONTAINING A LOW CRYSTALLINE SILICA CONTENT

FIELD OF THE DISCLOSURE

The present disclosure generally relates to diatomaceous earth products and, more particularly, relates to diatomaceous earth products containing low crystalline silica content.

BACKGROUND OF THE DISCLOSURE

Diatomaceous earth, also known as D.E., or diatomite, is a naturally occurring sedimentary rock which may be crumbled into a fine powder. The composition of diatomaceous earth is mainly amorphous silica formed from remains of diatoms, algae with siliceous skeletons. The unique porous silica structure of diatomaceous earth may allow for high absorptive capacity and surface area, chemical stability, and low bulk density. The properties may enable natural and/or processed diatomaceous earth to find applications as filtration media, absorbents for liquids, porous supports for catalysts, carriers for pesticides, fillers in paints and paper, and refractory or abrasive products in a variety of industries.

The natural diatomaceous earth has low permeability (i.e. between about 0.01 darcy and about 0.10 darcy) due to the particle size distribution and the inherent porous structure of the diatoms. To increase the permeability, the natural diatomaceous earth has to be further processed, for instance, by heating, to sinter the diatoms, dehydrate and reduce the specific surface area of the particles.

In practice, when preparing diatomaceous earth filter aids with high permeability, the diatomaceous earth from ore is transported to a mill, crushed, ground, screened, pre-treated to remove extraneous material or unwanted ingredients, and then calcined at temperatures greater than about 1000° C. (1832° F.) in a rotary kiln or calciner. If the crude material is only calcined without adding a flux agent, the ensuing products are called calcined diatomaceous earth. If a fluxing agent is added to the rotary calciner during the calcination process, the resulting products are called flux-calcined diatomaceous earth. The purpose of the calcination step is to create a better filtering agent with desired permeabilities and agglomeration forms by further hardening the exoskeletons of the diatoms and forming coarse agglomerates of individual diatoms. Calcination may also oxidize organic substances and convert or decompose various undesirable inorganic compounds into oxides, silicate, or aluminosilicates.

Since diatom skeletons comprise mainly amorphous silica, the naturally-occurring diatomaceous earth is largely amorphous with a small amount of crystalline silica in the forms of quarts or cristobalite. The amount of crystalline silica (about 0.0-about 1.1 wt %) in natural diatomaceous earth is relatively small. However, more crystalline silica, mainly cristobalite, can be formed when the diatomaceous earth is calcined at temperatures above 1000° C. (1832° F.). It is known that the crystallization of silica (cristobalite) from amorphous silica is extremely slow below 600° C. (1112° F.), remains slow up to 850° C. (1562° F.), but increases very rapidly at temperatures above 900° C. (1652° F.). Consequently, conventional calcination methods may produce diatomaceous earth filter aids containing between about 20 wt % and about 75 wt % of crystalline silica. Such high amount of crystalline silica in calcined diatomaceous earth may be undesirable in some applications.

Currently one type of flux calcination process uses sodium carbonate or other sodium compounds as fluxing agents to fuse diatomaceous earth and increase the permeability, thereby producing fast grades of filter aids. However, the use of sodium compounds during calcination results in an undesirable increase in the amount of crystalline silica, mainly cristobalite, in the calcined final product.

To better answer the challenges raised by the filter aid industry to produce fast, permeable diatomaceous earth products, there is a need to develop a manufacturing method which leads to the production of calcined diatomaceous earth products with high permeability (for example, greater than about 1.0 darcy) and low crystalline silica content (for example, lower than about 4 wt %).

SUMMARY OF THE DISCLOSURE

In accordance with one aspect of the present disclosure, a diatomaceous earth product is disclosed. The diatomaceous earth product may have undergone at least one calcination step, and may comprise diatomaceous earth, at least one binding agent and no more than 4 wt % of crystalline silica. The at least one calcination step may be conducted between about 927° C. (1700° F.) and 1149° C. (2100° F.). The at least one binding agent may comprise potassium silicate. The diatomaceous earth product may have a permeability in the range of about 0.3 darcy to greater than about 20 darcy.

In a refinement, the at least one binding agent of the diatomaceous earth product may consist of potassium silicate.

In another refinement, the at least one calcination step for the diatomaceous earth product may be conducted between about 982° C. (1800° F.) and about 1093° C. (2000° F.).

In another refinement, the at least one calcination step for the diatomaceous earth product may last from about 30 minutes to about two hours.

In another refinement, the potassium silicate of the diatomaceous earth product may be present in an amount ranging from about 1 wt % to about 10 wt %.

In another refinement, the diatomaceous earth product may be air classified.

In another refinement, the permeability of the diatomaceous earth product may range from about 0.3 darcy to about 20 darcy.

In another refinement, the permeability of the diatomaceous earth product may range from about 0.8 darcy to about 20 darcy.

In another refinement, the permeability of the diatomaceous earth product may range from about 1 darcy to about 20 darcy.

In another refinement, the permeability of the diatomaceous earth product may range from about 1.2 darcy to about 16 darcy.

In another refinement, the crystalline silica of the diatomaceous earth product may be no more than about 2 wt %.

In another refinement, the diatomaceous earth product may further include a setting agent which comprises calcium lignosulfonate and magnesium hydroxide.

In still another refinement, the amount of crystalline silica of the diatomaceous earth may range from about 2 wt % to about 6 wt %.

In accordance with another aspect of the present disclosure, a process for making a low crystalline silica content diatomaceous earth product is disclosed. The process may comprise: providing natural diatomaceous earth, treating the natural diatomaceous earth with at least one binding agent to make a mixture, and subjecting the mixture to at least one calcination step. The at least one calcination step may be conducted between about 927° C. (1700° F.) and about 1149° C. (2100° F.). The at least one binding agent may comprise potassium silicate. The diatomaceous earth product may have a permeability in the range of about 0.3 darcy to greater than about 20 darcy. In addition, the diatomaceous earth product may have a crystalline silica content of no more than about 4 wt %.

In a refinement, the at least one binding agent used in the process may consist of potassium silicate.

In another refinement, the at least one calcination step of the process may be conducted between about 982° C. (1800° F.) and about 1093° C. (2000° F.).

In another refinement, the at least one calcination step of the process may last from about 30 minutes to about two hours.

In another refinement, the potassium silicate used in the process may be present in an amount ranging from about 1 wt % to about 10 wt %.

In another refinement, the permeability of the diatomaceous earth product made by the process ranges from about 0.3 darcy to about 20 darcy.

In another refinement, the permeability of the diatomaceous earth product may range from about 1 darcy to about 20 darcy.

In another refinement, the permeability of the diatomaceous earth product may range from about 1.2 darcy to about 16 darcy.

In another refinement, the process further comprises a step of treating the mixture with a setting agent before the at least one calcination step. The setting agent may comprise calcium lignosulfonate and magnesium hydroxide.

In still another refinement, the amount of crystalline silica of the diatomaceous earth product made in the process may range from about 2 wt % to about 6 wt %.

In accordance with another aspect of the present disclosure, a diatomaceous earth filter aid is disclosed. The diatomaceous earth filter aid may comprise a calcined diatomaceous earth product. The calcined diatomaceous earth product may have a crystalline silica content of no more than about 4 wt %, a permeability in the range of about 0.3 darcy to greater than about 20 darcy, and at least one binding agent comprising potassium silicate. Further, the diatomaceous earth product may be calcined at a temperature between about 927° C. (1700° F.) and about 1149° C. (2100° F.) for at least about 45 minutes.

In a refinement, the diatomaceous earth filter aid may have a permeability that ranges from about 0.3 darcy to about 20 darcy.

In a refinement, the diatomaceous earth filter aid may have a permeability that ranges from about 1 darcy to about 20 darcy.

In a refinement, the diatomaceous earth filter aid may have a permeability that ranges from about 1.2 darcy to about 16 darcy.

Before proceeding with the detailed description, it is to be appreciated that the following detailed description is merely exemplary in nature and is not intended to limit the invention or the application and uses thereof. In this regard, it is to be additionally appreciated that the described embodiment is not limited to use in conjunction with a particular type of heat exchange element or gas turbine. Hence, although the present disclosure is, for convenience of explanation, depicted and described as shown in certain illustrative embodiments, it will be appreciated that it can be implemented in various other types of embodiments and equivalents, and in various other systems and environments.

BRIEF DESCRIPTION OF THE DRAWINGS

FIG. 1 is a flowchart illustrating exemplary steps of a process for making a low crystalline silica content diatomaceous earth product, in accordance with the present disclosure.

DETAILED DESCRIPTION OF THE DISCLOSURE

This disclosure describes diatomaceous earth products, processes for preparing the diatomaceous earth products, and methods for using the diatomaceous earth products. Further, the diatomaceous earth products may have improved permeability when compared to the starting material, natural diatomaceous earth. The permeability of a diatomaceous earth product disclosed herein may be, for example, about 0.3 darcy, higher than about 0.3 darcy, about 1 darcy, about 1.2 darcy or higher than about 2 darcy, while its crystalline silica content may be, for example, no more than about 4 wt %, or no more than about 2 wt %. In addition, the disclosed diatomaceous earth products may be made from the natural diatomaceous earth and a binding agent after a calcination process.

1. Natural Diatomaceous Earth

Processes for preparing the diatomaceous earth products of the present disclosure comprise using natural diatomaceous earth as a starting material. As used herein, the term "natural diatomaceous earth" means any diatomaceous earth material that has not been subjected to calcination or flux calcination steps. The natural diatomaceous earth may be from a saltwater source or a freshwater source. In addition, the natural diatomaceous earth may be a material capable of being used in a filter aid product, either in its crude form or after subjecting the material to one or more processing steps. The natural diatomaceous earth may be a processed product or may be an unprocessed material, the latter of which may be directly transported from an ore without undergoing any chemical or mechanical modification process. The natural diatomaceous earth may be from Sequoya Ore, either processed or unprocessed.

As discussed earlier, the natural diatomaceous earth may be a sedimentary biogenic silica deposit comprising the skeletons (frustules) of diatoms, algae-like plants that accumulate in either marine or fresh water environments. The intrinsic porous silica structures generally may give diatomaceous earth useful characteristics such as absorptive capacity and surface area, chemical stability, and low-bulk density. The natural diatomaceous earth may comprise about 90% $SiO_2$ mixed with other substances. Additionally, the natural diatomaceous earth may include, but is not limited to, various mineral compounds, quantified as oxides such as, for example, aluminum oxide, ferrous and/or ferric oxide, calcium oxide, and manganese oxides, and other substance such as, for example, bentonites.

The natural diatomaceous earth may have an appropriate form known to a skilled artisan. If the natural diatomaceous earth undergoes minimal processing following mining or extraction, it may be subjected to at least one mechanical modification process. The skilled artisan will readily know mechanical modification processes appropriate for use in the present disclosure. These processes may be known and may include, but are not limited to, for example, milling, drying, and air classifying. The natural diatomaceous earth may be subjected to at least one chemical modification process. The skilled artisan will readily know chemical modification processes appropriate for such use. Appropriate chemical modification processes may include, but are not limited to, silanization. Silanization may be used to render the surfaces of the at least one natural diatomaceous earth either more hydrophobic or hydrophilic using the methods appropriate for silicate minerals.

The natural diatomaceous earth starting material used in the present disclosure may be Sequoya Ore, either hand-milled or hammer-milled to a specific maximum particle size such as, for example, about 40 mesh, about 60 mesh, or about 80 mesh. The crystalline silica content in the Sequoya Ore starting material may be, for example, about 0.4 wt %, about 0.6 wt %, about 0.8 wt %, about 1.0 wt %, or about 1.1 wt %. Further, the permeability of the natural diatomaceous earth starting material may be, for example, about 0.020 darcy, about 0.060 darcy, about 0.080 darcy, or about 0.10 darcy. In addition, the milled Sequoya Ore diatomaceous earth starting material may go through a whizzer separator and have some waste removed to produce Sequoya LCS-3 diatomaceous earth starting material for the present disclosure. Generally speaking, the crystalline silica content and the particle size of the Sequoya LCS-3 are similar to those of Sequoya Ore. Moreover, other natural diatomaceous earth sources may be used as well in the present disclosure.

2. Binding Agent

In searching for a new method to produce low crystalline silica diatomaceous earth products and filter aids, the inventors realized that one major challenge with the slow permeability of diatomaceous earth products may be the fine particles, especially at low calcination temperature. These fine particles tend to attach onto the surfaces of larger particles due to electrostatic charges, such as, for example, triboelectric charges. When wetted, the electrostatic attraction between the temporarily bound particles may be weakened. Subsequently the fine particles may be released from the surface of the hosting larger particles, drift into and block pores, and decrease the permeability for the filter aid. Attempts to remove or separate these fine particles from other larger particles using mechanical methods have not been successful. Alternatively, if the fine particles could be permanently attached onto the larger particles, the fine particles may not drift away and block pores, and thereby not cause slow permeability in the diatomaceous earth products. Accordingly, use of a binding agent that chemically binds and agglomerates small particles to other particles without negatively impacting selected properties of the diatomaceous earth products, including filter aids, is disclosed.

When sodium silicate was chosen as the binding agent and tested at low calcination temperatures while using a sodium flux, the natural diatomaceous earth was agglomerated without producing high amount of crystalline silica. However, low calcination temperatures while using a sodium flux may result in other problems, including, for example, high pH in the slurry, and a soft final product which may degrade during use. Lithium silicate was also tested but failed to produce the desired filter aid products.

Surprisingly, potassium silicate was found to be a suitable binding agent for the present disclosure. When potassium silicate is used in the calcination process, diatomaceous earth filter aid products with desired properties were obtained. In one embodiment, the diatomaceous earth product thus obtained may utilize one type of potassium silicate such as KASOLV® 16 potassium silicate, which is commercial available from PQ Corporation (Malvern, Pa.). In other embodiments, other types of potassium silicate may be used.

Furthermore, the amount of potassium silicate used as a binding agent may be for example, between about 1.0 wt % and about 10 wt %, between about 1.0 wt % and about 6.0 wt %, or between about 2.0 wt % and about 5.0 wt %.

The natural diatomaceous earth starting material is subjected to calcination with at least one binding agent of potassium silicate. Neither sodium carbonate nor calcium silicate was used during the calcination step.

Without being bound to any particular theory, it is believed that the size and bond length of the potassium ion in the crystalline lattice may be factors in achieving the agglomeration of the fine particles of diatomaceous earth without dramatically increasing the content of crystalline silica in the calcined product. On one hand, the potassium ion may bond small fine particles of amorphous silica to the surface of other particles so that a bigger particle of amorphous silica is produced. On the other hand, the potassium ion may be of the suitable size to disrupt a fast growth of new layer on the exposed surface of crystalline silica in such a way that the growth of new crystalline silica is much slower than when using a flux agent such as sodium carbonate. In other words, while the sodium ion may fit perfectly within a crystalline lattice of crystalline silica, the potassium ion may fit less perfectly within the crystal structure, and thereby prevent the ensuing crystal growth. In summary, the use of potassium silicate may provide a solution to agglomerating amorphous diatomaceous earth particles without significantly increasing the amount of crystalline silica when undergoing calcination at high temperatures.

3. Setting Agents

Other than the binding agent, other materials, such as a setting agent, may be added to help the binding agent better perform its function during calcination. The setting agent may comprise calcium lignosulfonate and magnesium hydroxide. Other setting agents may be used as well.

4. Calcination Process

The calcination of at least one type of natural diatomaceous earth material and at least one binding agent may occur through any appropriate calcination process known to the skilled artisan or described herein. For example, the process may comprise preparing at least one aqueous solution of the at least one binding agent, and contacting the at least one binding agent solution with the diatomaceous earth material. The at least one binding agent may also be applied as a solid material with a pre-determined particle size distribution. One or more mixing steps may be performed, for example, when multiple rounds of binding agents and multiple diatomaceous earth materials are used.

Contacting the diatomaceous earth may comprise mixing a binding agent solution with diatomaceous earth material. In addition, the mixing may comprise agitation. The diatomaceous earth and the binding agent solution may be mixed with sufficient agitation to at least substantially uniformly distribute the binding agent solution among the agglomeration points of contact of the diatomaceous earth without damaging the structure of the diatomaceous earth. Furthermore, contacting may comprise low-shear mixing. Mixing may last, for example, about 10 minutes, about 20 minutes, about 30 minutes, about 1 hour, about 2 hours, about 3 hours, or about 4 hours. Other time lengths are possible.

Contacting may comprise spraying diatomaceous earth with at least one binding agent solution. The spraying may be intermittent or continuous. While spraying the diatomaceous earth with the at least one binding agent solution, the whole mixture may be mixing. Such mixing may be intermittent or continuous. The mixing could be accomplished by hand or by machine such as, for example, a blending machine.

As to the mixing temperature, it may be, for example, from about 20° C. (68° F.) to about 25° C. (77° F.), from about 20° C. (68° F.) to about 50° C. (122° F.), from about 30° C. (86°

F.) to about 45° C. (113° F.) or from about 35° C. (95° F.) to about 40° C. (104° F.). Other temperature ranges are possible.

The mixture of the natural diatomaceous earth material with at least one binding agent may be subjected to at least one heat treatment. Appropriate heat treatment processes are well-known to the skilled artisan, and may include those now known and those described herein. The least one heat treatment may decrease the amount of organics and/or volatiles in the heat-treated diatomaceous earth products. For example, the at least one heat treatment may be at least one calcination. No sodium carbonate is used in the heat treatment step or calcination step.

Calcination conditions may be conducted according to any appropriate calcination parameters now known to the skilled artisan or those described herein. For instance, calcination may be conducted at temperatures below the melting point of the diatomaceous earth. Specifically, calcination may be conducted at a temperature of, for example, from about 1700° F. (927° C.) to about 2100° F. (1149° C.), from about 1800° F. (982° C.) to about 2000° F. (1093° C.), or from about 1900° F. (1038° C.) to about 2000° F. (1093° C.). In addition, the calcination temperature may be chosen from the group consisting of about 1700° F. (927° C.), about 1800° F. (982° C.), about 1900° F. (1038° C.), about 1930° F. (1054° C.), and about 2000° F. (1093° C.). Other calcination temperatures are possible.

Calcination may be conducted in at least one calcination vessel according to any appropriate process now known to the skilled artisan or those described herein. For example, calcination may be carried out in, for example, a furnace, a reactor, a kiln, a rotary kiln, a shaft furnace, a multiple hearth furnace, a fluidized bed reactor, or the like.

The calcination time may be, for example, from about 4 minutes to about two hours, from about 30 minutes to about two hours, from about 10 minutes to about 1.5 hours, from about 20 minutes to about 1 hour, or from about 30 minutes to about 50 minutes. Other time lengths are possible.

5. Diatomaceous Earth Products

The diatomaceous earth products made by the processes described herein may have one or more beneficial attributes, making them desirable for use in one or a number of given applications. For example, the diatomaceous earth products may be useful as part of a filter aid composition. Furthermore, a filter aid composition may comprise at least one diatomaceous earth product of the present disclosure.

The diatomaceous earth products disclosed herein may have a permeability suitable for use in a filter aid composition. Permeability may be measured by any appropriate measurement technique now known to the skilled artisan or those described herein. Permeability may be generally measured in darcy units or darcy, as determined by the permeability of a porous bed 1 cm high and with a 1 $cm^2$ section through which flows a fluid with a viscosity of 1 mPa·s with a flow rate of 1 $cm^3$/sec under an applied pressure differential of 1 atmosphere. The principles for measuring permeability have been previously derived for porous media from Darcy's law (see, for example, J. Bear, "The Equation of Motion of a Homogeneous Fluid: Derivations of Darcy's Law," in *Dynamics of Fluids in Porous Media*, 161-177 (2nd ed. 1988)). An array of devices and methods are in existence that may correlate with permeability. For example, one exemplary method useful for measuring permeability may include a specially constructed device which is designed to form a filter cake on a septum from a suspension of filtration media in water. The time required for a specified volume of water to flow through a measured thickness of filter cake of known cross-sectional area may be measured. From the measurement, a permeability value may be calculated.

According to the present disclosure, the diatomaceous earth product may have a permeability of, for example, about 0.3 darcy, about 0.6 darcy, about 0.8 darcy, about 1 darcy, about 1.2 darcy, about 2 darcy, about 3 darcy, about 4 darcy, about 5 darcy, about 10 darcy, about 15.2 darcy, about 16 darcy, about 20 darcy, or greater than about 0.3 darcy. The diatomaceous earth product may have a permeability in the range of about 0.3 darcy to about 20 darcy.

The diatomaceous earth products disclosed herein may have a particle size. Particle size may be measured by any appropriate measurement technique now known to the skilled artisan or those described herein. For example, particle size and particle size properties, such as particle size distribution ("psd"), are measured using a Microtrac S3500 laser particle size analyzer (Microtrac, Inc, Montgomeryville, Pa., USA), which can determine particle size distribution over a particle size range from about 0.12 μm to about 704 μm. The size of a given particle is expressed in terms of the diameter of a sphere of equivalent diameter that sediments through the suspension, also known as an equivalent spherical diameter or "esd." The median particle size, or $d_{50}$ value, is the value at which 50% by weight of the particles have an esd less than that $d_{50}$ value. The $d_{10}$ value is the value at which 10% by weight of the particles have an esd less than that $d_{10}$ value. The $d_{90}$ value is the value at which 90% by weight of the particles have an esd less than that $d_{90}$ value.

The diatomaceous earth products disclosed herein may have a low crystalline silica content. Forms of crystalline silica may include, but be not limited to, quartz, cristobalite, and tridymite. For instance, a diatomaceous earth product made by the processes disclosed herein may have a lower content of crystalline silica than a flux calcined diatomaceous earth product using sodium carbonate. The crystalline silica content may be measured by any appropriate measurement technique now known to the skilled artisan or those described herein. For example, cristobalite content may be measured by X-ray diffraction, for example, by the quantitative X-ray diffraction method outlined in H. P. Klug and L. E. Alexander, *X-Ray Diffraction Procedures for Polycrystalline and Amorphous Materials* 531-563 (2nd ed. 1972), which is incorporated by reference herein in its entirety.

Accordingly, a sample may be milled in a Spex mill to a fine powder, then back-loaded into a sample holder. The sample and its holder may be placed into the beam path of an X-ray diffraction system and exposed to collimated X-rays using an accelerating voltage of 50 kV and a current of 36 mA focused on a copper target. Diffraction data may be acquired by step-scanning over the angular region representing the interplanar spacing within the crystalline lattice structure of cristobalite, yielding the greatest diffracted intensity. That region may range from 21 to 23 degrees 2θ (2-theta), with data collected in 0.04 degree 2θ steps, counted for 4 seconds per step. The net integrated peak intensity may be compared with those of standards of cristobalite prepared by the standard additions method in amorphous silica to determine the weight percent of the cristobalite phase in a sample.

The quartz content may be measured by any appropriate measurement technique now known to the skilled artisan or those described herein. For instance, quartz content may be measured by X-ray diffraction, the same X-ray diffraction method described above for cristobalite content, except that the 2θ region may range from 26.0 to 27.5 degrees.

Furthermore, the diatomaceous earth product thus obtained may have crystalline silica content such as, for example, about 1 wt %, no more than about 1.2 wt %, no more than about 1.5 wt %, no more than about 2 wt %, or no more than about 2.5 wt %.

The soluble metal content of a diatomaceous earth material/product may be measured by any one or more of various measurement techniques now known to the skilled artisan or described herein. Since certain measurement techniques may be specific to certain metals, it may be necessary to perform more than one measurement technique to analyze the content of multiple metals. For example, the European Beverage Convention (EBC) method or modified EBC methods may be used to analyze the content of soluble metals in diatomaceous earth materials/products. The soluble metals may include, but are not limited to, iron, aluminum, calcium, and arsenic.

The diatomaceous earth products disclosed herein may comprise at least one soluble metal. As used herein, the term "soluble metal" refers to any metal that may be dissolved in at least one liquid. Soluble metals are known to those of skill in the art and include, but are not limited to, iron, aluminum, calcium, vanadium, chromium, copper, zinc, nickel, cadmium, and mercury.

The diatomaceous earth products disclosed herein may have a measurable wet bulk density (WBD), which refers to the measurement of centrifuged wet density. To measure WBD, a diatomaceous earth sample of known weight from about 1.00 g to about 2.00 g is placed in a calibrated 15.0 ml centrifuge tube, to which deionized water may be added to make up a volume of approximately 10 ml. The mixture may be shaken thoroughly until the entire sample is wetted, and no powder remains. Additional deionized water may be added around the top of the centrifuge tube to rinse down any mixture adhering to the side of the tube. The tube may then be centrifuged for 5 min at 2500 rpm on an IEC Centra® MP-4R centrifuge, equipped with a Model 221 swinging bucket rotor (International Equipment Company; Needham Heights, Mass., USA). Following centrifugation, the tube may be carefully removed without disturbing the solids, and the level (i.e., volume) of the settled matter may be measured in $cm^3$. The centrifuged wet density of powder may be readily calculated by dividing the sample mass by the measured volume. Furthermore, the WBD of the diatomaceous earth products described herein may range from about 13 $lb/ft^3$ to about 22 $lb/ft^3$, and from about 15 $lb/ft^3$ to about 20 $lb/ft^3$.

6. Uses for Diatomaceous Earth Products

The diatomaceous earth products disclosed herein may be used in any of a variety of processes, applications, and materials. For example, the diatomaceous earth products may be used in at least one process, application, or material in which such a product with a high permeability and high surface area is desirable.

Further, a diatomaceous earth filter aid may be comprised of a filter aid material or composition. The filter aid composition may comprise at least one diatomaceous earth product, and may optionally also include at least one additional filter aid medium. Examples of such suitable additional filter aid media may include, but are not limited to, natural or synthetic silicate or aluminosilicate materials, unimproved diatomaceous earth, saltwater diatomaceous earth, expanded perlite, pumicite, natural glass, cellulose, activated charcoal, feldspars, nepheline syenite, sepiolite, zeolite, or clay. Other additional filter aid media are possible.

In addition, the filter aid composition may be formed into sheets, pads, cartridges, or other monolithic or aggregate media capable of being used as supports or substrates in a filter process. Considerations in the manufacture of filter aid compositions may include a variety of parameters, including but not limited to total soluble metal content of the composition, median soluble metal content of the composition, particle size distribution, pore size, cost, and availability.

Filter aids comprising at least one diatomaceous earth product of the present invention may also be employed to filter various types of liquids. The skilled artisan may be readily aware of liquids that may be desirably filtered with a process using the filter aids comprising at least one diatomaceous earth product disclosed herein. Moreover, the liquid may be, for example, a beverage, an oil, an edible oil, a fuel oil, water, waste water, blood, a sake, and a sweetener, such as for example corn syrup or molasses.

The diatomaceous earth products disclosed herein may also be used in applications other than filtration.

Unless otherwise indicated, all numbers expressing quantities of ingredients, reaction conditions, and so forth used in the specification, including claims, are to be understood as being modified in all instances by the term "about." Accordingly, unless otherwise indicated to the contrary, the numerical parameters are approximations and may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Combinations of the various listed embodiments are contemplated. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

EXAMPLE

X-Ray Fluorescence (XRF) analysis was performed on the Sequoya Ore diatomaceous earth starting material and Sequoya LCS-3 diatomaceous earth starting material using a standard XRF method. The XRF was done before adding binding agents and undergoing the calcination step. Peak intensities from spectra were analyzed by line shape analysis comparison with single element reference spectra. The peak intensities for the diatomaceous earth standard were then converted into pure element count rates that were then used for determination of element composition in samples, by peak intensity analysis and data fitting. Results of the XRF chemical analysis are shown in Table 1. The total metal content by XRF was higher in Sequoya LCS-3 than in Sequoya Ore.

TABLE 1

| | $SiO_2$ (%) | $Al_2O_3$ (%) | CaO (%) | MgO (%) | $Na_2O$ (%) | $K_2O$ (%) | $Fe_2O_3$ (%) |
|---|---|---|---|---|---|---|---|
| Sequoya LCS-3 | 85.23 | 4.79 | 0.49 | 0.50 | 1.69 | 0.43 | 1.16 |
| Sequoya Ore | 86.49 | 4.29 | 0.37 | 0.37 | 1.40 | 0.44 | 0.90 |

Examples 1-6

The un-dried Sequoya Ore was hand milled to about 40 mesh, mixed with either 0% or 5% of binding agent (KA-SOLV® 16 potassium silicate), then calcined at about 927° C. (1700° F.), about 982° C. (1800° F.), or about 1038° C. (1900° F.) for about 45 minutes. The results obtained from Examples 1-6 are illustrated in Table 2. Table 2 illustrates the effects of varying calcination temperatures and amounts of binding agent on the physical properties and soluble metal properties of the diatomaceous earth products.

As demonstrated by the results shown in Table 2, diatomaceous earth products were generated having better permeability and crystalline silica content at higher calcination temperatures. It is noteworthy that, when comparing Example 5 and 6, at 1900° F. calcination temperature, the addition of 5% potassium silicate as a binding agent increased the permeability of the product by more than three-fold while only increasing the crystalline silica content by 20%. Without wishing to be bound by any particular theory, the data suggested that the binding agent, such as potassium silicate, may be used to effectively bind diatomaceous earth particles without drastically increasing the formation of crystalline silica.

TABLE 2

| Example | Binding Agent (%) | Temperature °C./°F. | Permeability (Darcy) | WBD (lb/ft³) | EBC Al (ppm) | EBC Ca (ppm) | EBC Fe (ppm) | C.S. (%) |
|---|---|---|---|---|---|---|---|---|
| 1 | 0 | 927° C./1700° F. | 0.21 | 20.9 | 250 | 766 | 59 | N/A |
| 2 | 5 | 927° C./1700° F. | 0.95 | 17.7 | 123 | 1377 | 291 | 2.2 |
| 3 | 0 | 982° C./1800° F. | 0.67 | 19.2 | 179 | 731 | 46 | 0.4 |
| 4 | 5 | 982° C./1800° F. | 2.8 | 17.9 | 61 | 1388 | 107 | 1.8 |
| 5 | 0 | 1038° C./1900° F. | 1.5 | 17.1 | 88 | 652 | 30 | 1.0 |
| 6 | 5 | 1038° C./1900° F. | 5.2 | 16.6 | 40 | 390 | 71 | 1.2 |

Examples 7-11

Additional trials using Sequoya LCS-3 starting materials were performed. This material went through a whizzer separator and had some waste removed. The Sequoya LCS-3 had the following particle size distribution: $d_{10}$ of 3.2 μm, $d_{50}$ of 11.6 μm, and $d_{90}$ of 33.5 μm. The crystalline silica content in Sequoya LCS-3 was 0.5 wt %.

The Sequoya LCS-3 diatomaceous earth starting material was mixed with 0-5% of binding agent (KASOLV® 16 potassium silicate), then calcined at about 1038° C. (1900° F.) for about 45 minutes. The results obtained from Examples 7-11 together with a prior art sample FW14 are illustrated in Table 3. FW14 was made using the standard flux calcination process using sodium carbonate as the flux agent. Table 3 illustrates the effects of varying calcination temperatures and amounts of binding agent on the physical properties and chemical properties of the diatomaceous earth products.

As demonstrated by the results shown in Table 3, increasing the binding agent led to improved permeability and slightly increased crystalline silica formation. In addition, increasing the binding agent amount seemed to lower soluble aluminum and calcium, but increase soluble iron slightly. Furthermore, when comparing the data of Example 11 with those of Example 7, it seemed that the Sequoya LCS-3 material produced much lower EBC soluble calcium than the Sequoya Ore material. One possible reason may be that the whizzer separator removed some calcium minerals such as calcite and/or gypsum.

TABLE 3

| Example | Binding Agent (%) | Permeability (Darcy) | WBD (lb/ft³) | EBC Al (ppm) | EBC Ca (ppm) | EBC Fe (ppm) | EBC As (ppm) | C.S. (%) | K* (ppm) | pH |
|---|---|---|---|---|---|---|---|---|---|---|
| 7 | 0 | 0.25 | 16.8 | 73 | 714 | 35 | N/A | 1.1 | 3.5 | 7.1 |
| 8 | 2 | 1.2 | 14.3 | 60 | 634 | 49 | 10.3 | 1.1 | 12.5 | 7.1 |
| 9 | 3 | 1.5 | 13.2 | 57 | 513 | 48 | 9 | 1.3 | 17.9 | 7.1 |
| 10 | 4 | 1.6 | 14.5 | 48 | 397 | 59 | 8 | 1.5 | 29.1 | 7.4 |
| 11 | 5 | 2.2 | 13.2 | 34 | 312 | 59 | N/A | 1.9 | 39.2 | 7.9 |
| FW14 | 0 | 1.2 | 20.4 | 35 | 113 | 79 | 0.4 | 32 | N/A | 10 |

*Water soluble potassium concentration in the product.

Examples 12-15

Example 12 was made from the un-dried Sequoya Ore, which was hand milled to about 40 mesh. The ore was calcined at about 1900° F. for about 45 minutes. Examples 13-15 used the same ore, but with about 2%, about 4%, and about 5% of binding agent (either KASOLV® 16 potassium silicate or India potassium silicate). The mixtures were calcined at either about 1038° C. (1900° F.) or about 1054° C. (1930° F.) for about 45 minutes. Examples 12-15 were air classified.

Filtration clarity test was performed with Examples 12-13 together with prior art products (FW-12, FW-20, FW-40, and FW-80). The test medium is an alumina powder slurry ($d_{50}$ of 1 μm) with a starting turbidity of more than 2000 NTU. Filtrations were done using a small single-septum pressure filter with pre-coat only. After a filtration time of 5 minutes, turbidity was tested. The results obtained are illustrated in Table 4. Table 4 shows that the clarity obtained was similar between products with similar permeability.

TABLE 4

| Example | Binding Agent (%) | Temperature °C./°F. | Permeability (Darcy) | WBD (lb/ft³) | Turbidity (NTU) | Recovery (%) | C.S. (%) |
|---|---|---|---|---|---|---|---|
| 12 | 0 | 1038° C./1900° F. | 0.22 | 23.6 | 5 | unknown | 0.8 |
| 13 | 2 | 1038° C./1900° F. | 1.24 | 16.4 | 5 | 86 | 1.4 |
| 14 | 4 | 1038° C./1900° F. | 2.03 | 15.9 | 243 | 86 | 2.0 |
| 15 | 5 | 1054° C./1930° F. | 15.3 | 16.6 | 1863 | 82 | 2.0 |
| FW-12 | / | / | 1.00 | 20.0 | 97 | N/A | 66 |

TABLE 4-continued

| Example | Binding Agent (%) | Temperature °C./°F. | Permeability (Darcy) | WBD (lb/ft³) | Turbidity (NTU) | Recovery (%) | C.S. (%) |
|---|---|---|---|---|---|---|---|
| FW-20 | / | / | 2.16 | 19.5 | 388 | N/A | 60 |
| FW-40 | / | / | 4.11 | 20.9 | 683 | N/A | 50 |
| FW-80 | / | / | 10.6 | 19.3 | 1327 | N/A | 44 |

Combinations of the various listed embodiments are contemplated. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

INDUSTRIAL APPLICABILITY

From the foregoing, it can be seen that the present disclosure describes diatomaceous earth products containing a low crystalline silica content and the process producing thereof. Such diatomaceous earth products may find industrial applicability in many applications including, but not limited to, filtration aids in the beer industry.

Also disclosed is process for making a low crystalline silica content diatomaceous earth product. The process is illustrated in FIG. 1. Step 10 of the process is providing (starting with) natural diatomaceous earth. Step 20 of the process is treating the natural diatomaceous earth with at least one binding agent to make a mixture. Step 30 of the process is treating the mixture with a setting agent. In one embodiment, the setting agent may comprise calcium lignosulfonate and magnesium hydroxide. Step 40 of the process is subjecting the mixture to at least one calcination step. In an embodiment, the at least one calcination step may be conducted between about 927° C. (1700° F.) and about 1149° C. (2100° F.). The at least one binding agent may comprise potassium silicate. The diatomaceous earth product may have a crystalline silica content of no more than about 4 wt %. In another embodiment, the diatomaceous earth product may have a crystalline silica content of no more than about 2 wt %.

In an embodiment, the diatomaceous earth product may have a permeability of about 0.3. In another embodiment the diatomaceous earth product may have a permeability greater than about 0.3 darcy. In another embodiment the diatomaceous earth product may have a permeability greater than about 0.6 darcy. In yet another embodiment the diatomaceous earth product may have a permeability greater than about 0.8 darcy. In another embodiment the diatomaceous earth product may have a permeability greater than about 1 darcy. In yet another embodiment, the diatomaceous earth product may have a permeability greater than about 1.2 darcy. In yet another embodiment, the diatomaceous earth product may have a permeability greater than about 15.2 darcy. In yet another embodiment, the diatomaceous earth product may have a permeability greater than about 16 darcy.

In an embodiment, the diatomaceous earth product may have a permeability in the range of about 0.3 darcy to greater than about 20 darcy. In another embodiment, the diatomaceous earth product may have a permeability in the range of about 0.3 darcy to about 20 darcy. In another embodiment, the diatomaceous earth product may have a permeability in the range of about 0.6 darcy to about 20 darcy. In yet another embodiment, the diatomaceous earth product may have a permeability in the range of about 0.8 darcy to about 20 darcy. In another embodiment the diatomaceous earth product may have a permeability in the range of about 1 darcy to about 20 darcy. In another embodiment the diatomaceous earth product may have a permeability in the range of about 1.2 darcy to about 16 darcy. In a further embodiment, the diatomaceous earth product may have a permeability in the range of about 1.2 darcy to about 15.2 darcy.

Current trends in diatomaceous earth filter aids are requiring a low content of crystalline silica and a faster filtration rate. By taking advantage of the unique properties of potassium silicate as a binding agent, the present disclosure provides a novel solution to the challenge raised in the filter aid industry. Based on this efficient process, the present disclosure may provide a novel alternative to producing diatomaceous earth with both low content of crystalline silica and high permeability. Moreover, using the novel diatomaceous earth products opens up new possibilities for filter aids applications which may have heretofore been limited by the conventional flux calcination process. Furthermore, due to the low content of crystalline silica, the diatomaceous earth products based on the present disclosure are more desirable than flux calcined products using sodium flux agents and still provide good permeability.

While the invention has been described with reference to certain embodiments, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A diatomaceous earth product comprising:
   natural diatomaceous earth;
   potassium silicate; and
   no more than about 4 wt % of crystalline silica after the natural diatomaceous earth and potassium silicate are combined to form a mixture and the mixture is calcined at a temperature between about 927° C. and about 1149° C., wherein the diatomaceous earth product has a permeability in the range of about 0.3 darcy to greater than about 20 darcy.

2. The diatomaceous earth product of claim 1, wherein the permeability ranges from about 0.8 darcy to about 20 darcy.

3. The diatomaceous earth product of claim 1, wherein the potassium silicate is present in an amount ranging from about 1 wt % to about 10 wt %.

4. The diatomaceous earth product of claim 1, wherein the permeability ranges from about 1 darcy to about 20 darcy.

5. The diatomaceous earth product of claim 1, wherein the permeability ranges from about 1.2 darcy to about 16 darcy.

6. The diatomaceous earth product of claim 1, wherein the crystalline silica is no more than about 2 wt %.

7. The diatomaceous earth product of claim 1, further comprising:

a setting agent comprising calcium lignosulfonate and magnesium hydroxide.

8. The diatomaceous earth product of claim 3, wherein the amount of potassium silicate ranges from about 2 wt % to about 5 wt %.

9. A process for making a low crystalline silica content diatomaceous earth product, comprising:
   providing natural diatomaceous earth;
   treating the natural diatomaceous earth with no more than about 5 wt % potassium silicate to make a mixture; and
   subjecting the mixture to at least one calcination step, wherein the at least one calcination step is conducted between about 927° C. and about 1149° C.,
   wherein the diatomaceous earth product has a permeability in the range of about 0.3 darcy to greater than about 20 darcy, and wherein the diatomaceous earth product has a crystalline silica content of no more than about 4 wt %.

10. The process of claim 9, wherein the at least one calcination step is conducted between about 982° C. and about 1093° C.

11. The process of claim 9, wherein the potassium silicate ranges from about 2 wt % to about 5 wt %.

12. The process of claim 9, wherein the permeability ranges from about 1 darcy to about 20 darcy.

13. The process of claim 9, further comprising a step of:
   treating the mixture with a setting agent before the at least one calcination step,
   wherein the setting agent comprises calcium lignosulfonate and magnesium hydroxide.

14. A diatomaceous earth filter aid comprising:
   at least about 95 wt % natural diatomaceous earth; and
   about 5 wt % or less potassium silicate;
   wherein the natural diatomaceous earth and potassium silicate are combined to form a mixture and calcined at a temperature between about 927° C. and about 1149° C. for at least about 45 minutes to provide the diatomaceous earth filter aid having a crystalline silica content no more than about 4 wt % and a permeability in the range of about 0.3 darcy to greater than about 20 darcy.

15. The diatomaceous earth filter aid of claim 14, wherein the permeability ranges from about 1 darcy to about 20 darcy.

* * * * *